Patented Dec. 19, 1950

2,534,588

UNITED STATES PATENT OFFICE 2,534,588

PAPER BASE PLANOGRAPHIC PRINTING PLATE

Frederick H. Frost, Portland, Maine, assignor to S. D. Warren Company, Boston, Mass., a corporation of Massachusetts No Drawing. Application July 14, 1947, Serial No. 760,939

15 Claims. (Cl. 101—149.2)

This invention relates to planographic printing plates or surfaces and to methods of making them.

The invention resides in the improvement of the printing properties of planographic printing plates or surfaces by rubbing, brushing or buffing such plates or surfaces.

My invention is applicable generally to planographic printing surfaces containing a hydrophilic colloid and has been found generally to improve the printing properties of such surfaces.

The ability of surfaces to serve as planographic printing surfaces depends mainly upon their ability when dry to receive the marking to be printed, said marking being wettable by the printing ink, the ability of the unmarked portions of the surface to be wetted by water or aqueous or other liquids, i. e. the so-called "etch" or "fountain" solutions, which are immiscible with the printing ink and the ability of the wetted unmarked surface to repel or resist being wetted by the printing ink. In use, a planographic printing surface bearing the marking to be printed is wetted with water or aqueous or other liquid which is immiscible with the printing ink, for instance by being contacted with a roll bearing a film of said liquid and the marked and wetted surface is then contacted with another roll bearing a film of the printing ink which deposits ink on the marked areas but not on the wetted and unmarked areas and then with a transfer blanket or roll and/or with a clear sheet whereby some of the ink and also some of the wetting liquid are transferred to the clear sheet.

The efficiency of a planographic printing surface depends upon a variety of factors but mainly upon the ability of the surface to retain the marking and the printing ink and the aqueous or other liquid which is immiscible with the ink upon its surface. That is to say, the ink and the liquid must each exclusively wet the imaged and unimaged areas of the surface and adhere strongly thereto but not penetrate through the surface into the underlying material of the plate. My process, in some manner which is not fully understood but perhaps by reducing the porosity of the surface, improves the ability of the surface to resist penetration by the ink and/or the aqueous or other liquid which is immiscible with the ink without impairing the wettability of the surface or the adhesion between the surface and the ink and the immiscible liquid.

The rubbing treatment may be applied in a variety of ways and with a variety of materials. For instance the surface may be rubbed or brushed or buffed or burnished by hand or by machine operation using cloth, felt, plush, bristles, horse hair, badger hair, cotton cloth or thread, nylon, rayon, tampico fiber or even fine wire. The flint glaze and analogous treatments, without the customary use of wax, in which the printing surface is rubbed with a smooth polished hard surface may be applied.

As stated, the effect of the treatment which will be referred to hereinafter as a rubbing treatment is not fully understood. There is generally more or less polishing of the surface, i. e. an increase in the shine or glossiness of the surface, although the degree of increase of gloss of the rubbed surface is not a reliable measure of the improvement of the surface for printing purposes. The process is not considered to be one of abrasion although some material usually is removed from the printing surface and appears as dust. This dust tends to accumulate on the rubbing device and has been observed to act as an abrasive. It is partly for this reason that bristle brushes are preferred for the rubbing operation because the dust, i. e. material removed from the printing surface does not objectionably accumulate on the brush bristles which therefore may continue in operation and the abrasive action of the dust is eliminated or minimized. Excessive abrasion of the printing surface is objectionable as is indicated by the fact that brushing the surface with a brush made of stiff bristles such as tampico fiber or fine metal wire produces a large amount of dust and does not give as much improvement of the printing properties of the printing surface as for instance the use of a brush formed of pig bristles.

That an actual physical alteration of the printing surface is brought about by the rubbing treatment is evidenced by the fact that the improved printing properties of the surface are lasting and persist after use and protracted storage of the printing plates.

The rubbing treatment ordinarily is applied to the final printing surface but as will be shown in the specific examples hereinafter the printing properties of a plate having a base coat and a wash coat may have its printing properties improved by rubbing the surface of the base coat before the wash coat is applied or by rubbing the surface after the wash coat is applied or both.

The amount of rubbing required cannot be defined in terms of any measurable effect on the surface excepting the improvement in printing properties of the surface. What constitutes an optimum rubbing of any particular surface with any particular rubbing device can of course readily be determined by testing the printing properties of the surface, i. e. by testing the printing surface of an unrubbed plate and of plates which have been subjected to the same rubbing treatment for different periods of time. Generally it will be found that a very brief rubbing treatment gives substantially as much improvement as a longer rubbing treatment.

It appears that printing surfaces, the printing qualities of which may be improved by rubbing must be not only surfaces which are wetted by the marking material, e. g. crayon, typewriter ink, etc., and by the printing ink and the wetting liquid which is immiscible with the printing ink but which also, to some extent, absorb the ink or the wetting liquid or both and further that the surface must be of such a character that the rubbing treatment reduces the absorption of the ink and the wetting liquid into the surface and the underlying material without harmfully reducing the wettability of the surface. It is upon this basis that I have advanced the theory that the improvement of the printing properties of the surface produced by rubbing is the result of a reduction of the porosity of the printing surface. It follows that if a printing surface is not porous, i. e. if it is not penetrated by the ink and the "etch" or "fountain" solution, its printing properties will not be improved by the rubbing treatment or stated differently if the porosity of a plate surface is not reduced by rubbing then its printing properties are not improved by rubbing.

A preferred application of the invention is to planographic printing plates comprising a paper or other suitable flexible support which in the case of paper may be rendered more or less resistant to water, a base coating consisting essentially of a hydrophilic colloid such as casein and a pigment or filler such as clay, said coating preferably having been rendered more or less insoluble as by the action of a colloid hardening agent such as formaldehyde and a light wash coat which is free of pigment as disclosed in the companion application of Stephen V. Worthen, Serial No. 747,138 filed May 9, 1947 (now abandoned). Said Worthen application relates to the improvement of the printing properties of such plates by a divalent metal salt treatment thereof. My invention is applicable for the improvement of the printing properties of such plates either with or without the salt treatment and if the surface of the base coat, without the wash coat or with or without the divalent metal salt surface treatment has planographic printing properties then my rubbing treatment is applicable for improving such printing properties. The invention is applicable further to the plates disclosed in an application of Stephen V. Worthen and Charles H. Van Dusen, Jr., Serial No. 788,660, filed November 28, 1947, and in an application of Stephen V. Worthen, Serial No. 758,215 filed June 30, 1947 (now abandoned).

Inasmuch as the present invention is concerned with the improvement of the printing properties of hydrophilic colloid containing printing surfaces generally by a rubbing or equivalent treatment, I shall not burden this disclosure with descriptions of such plates or enumeration of materials which are suitable for the production of such plates. Adequate disclosure of printing plates having hydrophilic colloid printing surfaces are found in the prior art and in said applications referred to above.

Some of the defects or faults of planographic printing plates which are eradicated or reduced by my rubbing treatment are the following:

Some planographic printing plates tend to give an indistinct image at the start of the printing process and to produce a stronger image as the use continues. My rubbing treatment generally improves such plates in this respect so that the rubbed plate gives a good image immediately or more quickly in use than the same plate without the rubbing treatment.

In the use of most planographic plates the printed matter tends to become blurred due to migration or partial loss of the image as the number of prints is increased. The rubbing treatment improves the plates in this respect, generally materially increasing the number of clear prints obtainable from a plate.

Planographic printing plates generally show a tendency for the clear areas to pick up ink from the inking roll and transfer it to the clear sheet, this tendency increasing as the number of prints increases. The plates are improved in this respect, i. e. the number of clean prints obtainable is considerably increased by the rubbing treatment. Another effect of the rubbing treatment is that it improves the clean-up properties of the plate which will be discussed below.

The rubbing treatment may serve the further useful purpose of removing any salt which may have crystallized on the surfaces of the plates as a result of the application thereto of a solution of a water-soluble, water-stable divalent metal salt as described in said applications.

Calendering or supercalendering the planographic printing plates does not produce the same effect on the plates as does my rubbing treatment. Calendering may be advantageous as applied to the base coat but my rubbing treatment applied to such calendered plates gives substantially the same degree of improvement of the printing properties as when applied to similar but uncalendered plates. Calendering evidently may advantageously smooth the surface of a printing plate but the effect of calendering appears to be distinct from the effect of rubbing treatment.

An improved property of the rubbed planographic printing plates which may serve to identify a rubbed plate and distinguish it from an unrubbed plate is what may be called the "erasure test." In this test a plate is marked, e. g. by being typed upon with a typewriter and a portion of the typing is erased with a soft rubber eraser and the erased spot re-typed and the plate then printed in the customary manner. If the re-typed portion prints blacker at the beginning than the remainder of the plate, this indicates that the plate had not been rubbed because when a rubbed plate is similarly tested the re-typed area does not print appreciably blacker than the remainder of the plate. This test is reliable when it is known that the plate consists of a base coat and a wash coat as described in the first Worthen application above referred to but it is not reliable when the plate has only a single hydrophilic colloid coating without the wash coat as described in the second Worthen application referred to above because some of such unrubbed plates do not give blacker printing on erased and retyped areas.

Another characteristic of the rubbed plates which is more reliable for determining whether or not a given plate has received the rubbing treatment is what may be called the "clean-up" test. In this test the plate to be tested is rubbed over part of its area with a soft cloth. Smears of printing ink are then applied to the rubbed and unrubbed areas. Then both smears are washed away with a tuft of loose cotton fiber saturated with wet out solution, e. g. a mixture of 25 parts by weight of glycerine and 75 parts by weight of water adjusted to a pH of 3.8 with mono ammonium acid phosphate. If the plate had not been previously rubbed the smear on the rubbed area will clean up better than the smear on the unrubbed area but if the smears clean up about equally well this indicates that the plate had been previously rubbed and that the test rubbing of part of its area therefore was without effect. In my experience with a variety of kinds of planographic printing plates having hydrophilic colloids in their printing surfaces, I have found that the rubbing treatment always produces an observable improvement in the clean-up properties of the plates.

Improvement of the clean-up properties of a plate for test purposes as described above is of course of only minor importance compared with the improvement of the clean-up properties of the plates in use because accidental ink smears are a common occurrence in the use of planographic printing plates and an improvement of the clean-up properties of the plates is therefore an important feature of my invention.

In practicing the invention I prefer to prepare a sized paper web of conventional paper-making fibers, said web suitably weighing from 15 to 40 pounds per 1000 square feets. The web preferably has wet-strength properties which can be given by addition in known manner of a melamine-formaldehyde condensation product to the paper-making furnish or alternatively (or conjunctively) the formed web may be surface treated with a solution of urea-formaldehyde, casein-formaldehyde, or the like. Surface sizing at this point is advantageous in laying down and binding the surface fibers of the sheet. The web is then coated by conventional means with a well-sized coating of pigment, e. g. clay, blanc fixe, satin white, or the like, and adhesive, e. g. casein, polyvinyl alcohol, soy protein, etc., which coating preferably contains a hardening agent to insolubilize the adhesive. The coating is preferably applied to both sides of the paper web, both to decrease curling troubles and to improve water resistance of the web. A suitable weight of coating is from 3 to 10 pounds per side per 1000 square feets. The so coated web may then be calendered to smooth it and make it lie flat, though such calendering is not necessary. I then apply a wash or desensitizing coat as described in said application Serial No. 747,138. The dry weight of wash or desensitizing coating so applied is normally quite small, say from 0.3 to 0.7 lb. per 1000 square feet. A suitable coating for this step is exemplified by gelatine dissolved in water containing ammonium dichromate as hardening agent. The wash coated web, after being dried, is passed over a cylindrical table during which passage the surface is brushed lightly with one or preferably several rotating cylindrical brushes which polish the surface and greatly improve the properties of the surface as previously described. Finally the web is cut into sheets of suitable size to be used as plates in duplicating or other planographic printing machines.

The invention is illustrated by the following specific examples:

Example 1

A wet-strength web weighing 30 pounds per 1000 square feet was prepared from a furnish containing paper-making fibers from coniferous and deciduous trees, rosin size, melamine-formaldehyde condensate, and alum. The formed web was then surface-sized with a solution of ammoniacal casein made slightly acidic by addition of commercial formaldehyde solution. About a pound dry weight of the sizing material was taken up per 1000 square feet of web. The web, when dry, was coated on each side with 8 pounds dry weight per 1000 square feet of a mixture containing 100 parts clay, 20 parts casein, and 1½ parts dimethylolurea. The coated web was dried and was then calendered. This product was then further treated as described in Examples 2 and 3 following.

Example 2

To one side of a coated web as prepared in Example 1 was applied a wash coat amounting to 0.7 pound per 1000 square feet of a dilute solution (about 3 per cent) of gelatin in water containing a little (6 per cent on the weight of the gelatin) ammonium chromate. The wash coated sheet was then dried, imprinted with an image and run in a planographic press. Another sheet of the same base was wash coated in the same way, dried, and then brushed lightly by four passes beneath a brush of medium hardness. This plate also was then imprinted with an image and run on a planographic press. The brushed plate after 700 impressions gave as clean and clear an impression as the unbrushed plate gave after 300 impressions.

Example 3

To one side of the coated web of Example 1 was applied a wash coat amounting to 0.6 pound (dry weight) per thousand square feet of a dilute (1 per cent) aqueous solution of alginic acid dissolved by alkali, which solution also contained dissolved ammonium chromate (30 per cent on the weight of the sodium alginate). The wash coated sheet was dried, imprinted with an image, and run in a planographic press. Another sheet was prepared in the same way except that before the image was applied the sheet was passed four times beneath a brush of medium hardness. This sheet after having the image applied was also run on a planographic press. The brushed plate after 800 impressions gave as clean and clear an impression as the unbrushed plate gave after 400 impressions.

Example 4

A paper base was first given a water-impenetrable barrier coat suitable for a long life plate. Then over the barrier coat was applied the usual clay, casein, and dimethylolurea coat, which was dried and calendered. A sheet of this product without further treatment was used as a printing plate. A second sheet was first rubbed and then used as a plate in comparison with the first. Neither plate was satisfactory, for both showed scumming. The rubbed plate, however, was much freer from scum than the unrubbed one, thus showing that the rubbing caused considerable improvement.

Example 5

In another instance a wet-strength paper was coated with a base coat containing 15 parts by weight of casein, 100 parts by weight of clay, and 20 parts by weight of 40 per cent formaldehyde solution. This was dried and calendered. One-half of a sheet was rubbed, while the other half was not rubbed. This sheet was then coated with a 1½ per cent solution of carboxymethylcellulose, dried, swabbed with 10 per cent zinc acetate solution, and again dried. The wash-coat was not rubbed. The sheet was used as a printing plate. The portion with the unrubbed base coat was scummy from the first; the portion with the rubbed base coat was perfectly clean after 200 impressions.

Example 6

In still another case, a wet-strength paper was coated with a coating containing 15 parts by weight of casein, 10 parts by weight of gum arabic, 100 parts by weight of clay, and 20 parts by weight of 40 per cent formaldehyde solution. This was dried, calendered and then swabbed over with a 15 per cent solution of zinc acetate. After being dried this was rubbed. When used as a plate this sheet was in excellent condition after 200 impressions.

In the foregoing Examples 2, 3, 4, 5 and 6, the clean-up properties of the surfaces, i. e. the ability to remove fresh ink smears by washing the surfaces with wet out solution was improved by the rubbing treatment. In most instances the smears could be removed so completely that they did not print at all. In Example 4 the clean-up was not perfect but was greatly improved as compared with the unrubbed surface.

Example 7

In another case a sheet of calendered standard coated base was taken; i. e. wet-strength paper coated with casein, clay, and methylolurea. A sheet 10 inches wide by 15 inches long was ruled down the middle, the long way. On one side of the center line the base coat was rubbed; on the other side it was not rubbed. The whole sheet was then given a wash-coat of a 1 per cent solution of sodium alginate to which had been added enough phosphoric acid to bring the pH value to exactly 4, but not low enough to coagulate the algin. This sheet was then allowed to age for a week and then exposed overnight to an atmosphere saturated with formaldehyde. The two halves of the sheet were again ruled down the middle and part of each half of the wash coated sheet was then rubbed. As a result the sheet was divided into 4 sections having different treatments as follows:

|  | Sect. 1 | Sect. 2 | Sect. 3 | Sect. 4 |
|---|---|---|---|---|
| Base Coat | not rubbed | not rubbed | rubbed | rubbed. |
| Top Coat | do | rubbed | not rubbed | Do. |

The sheet was then typed upon and used as an offset plate.

Sect. 1 scummed badly
Sect. 2 scummed moderately
Sect. 3 was clean after 200 impressions
Sect. 4 was clean after 200 impressions.

Based upon the foregoing specific examples and extensive experience with a wide variety of planographic printing plates, I wish to summarize or define the scope of my invention as being applicable to all planographic printing plate surfaces which comprise a hydrophilic colloid and which due to porosity are penetrated more or less by the planographic printing ink and/or the liquids which are used to wet the unmarked areas of the surfaces and which are immiscible with the ink. It has been my observation in numerous tests that the rubbing treatment improves the printing properties of the plates without giving rise to or increasing any objectionable property of the plates and that the life of the plate, i. e. the number of prints obtainable from a plate generally is increased from 10 per cent to 100 per cent or more.

This application is a continuation-in-part of my application Serial No. 691,654 filed August 19, 1946, now abandoned.

I claim:

1. A planographic printing element comprising a base sheet having thereon a coating comprised of a finely divided filler dispersed in a hydrophilic colloid adhesive, the surface of said coating having planographic printing properties which have been improved by rubbing in the hard and dry state and said rubbed surface being less penetrable by ink than the unrubbed surface.

2. A planographic printing element as defined in claim 1 in which the coating comprises a base coat consisting essentially of finely divided filler dispersed in hydrophilic colloid adhesive and a superposed wash coat of a hydrophilic material and in which the base coat has been rubbed in the hard and dry state.

3. A planographic printing element as defined in claim 1 in which the coating comprises a base coat consisting essentially of finely divided filler dispersed in a hydrophilic colloid adhesive and a wash coat of hydrophilic colloid material and in which the wash coat has been rubbed in the hard and dry state.

4. A planographic printing element as defined in claim 1 in which the coating comprises a base coat consisting essentially of a finely divided filler dispersed in a hydrophilic colloid adhesive and a superposed wash coat of hydrophilic colloid and in which both the base coat and the wash coat have been rubbed in the hard and dry state.

5. A planographic printing plate comprising a planographic printing element as defined in claim 1 and an image on the rubbed surface thereof.

6. Process for the production of a planographic printing element which comprises providing a base sheet with a coating comprised of a finely divided filler dispersed in a hydrophilic colloid adhesive, drying said coating and rubbing said coating in the hard and dry state whereby its penetrability by ink is reduced.

7. Process as defined in claim 6 in which a wash coat of hydrophilic material is applied to the rubbed surface of said coating.

8. Process for the production of a planographic printing element which comprises providing a base sheet with a base coat consisting essentially of a finely divided filler dispersed in a hydrophilic colloid adhesive, drying said base coat, applying a wash coat of hydrophilic colloid to said base coat, drying said wash coat and rubbing the surface of said wash coat in the hard and dry state whereby the penetrability of the combined base coat and wash coat by ink is reduced.

9. Process as defined in claim 8 in which both the base coat and the wash coat are rubbed in the hard and dry state.

10. A planographic printing plate comprising a base sheet having thereon a hard and dried and initially porous coating comprising a hydrophilic adhesive having finely divided inert mineral filler dispersed therethrough, the said initially porous and hard and dried coating having an outer portion providing a planographic image-receptive printing surface which, when dried, is readily wettable by greasy planographic image-forming materials and by aqueous planographic etching and dampening solutions, but is grease-repellent when wet, the said initially porous and hard and dried coating being characterized by a marked decrease in its porosity as the result of having been rubbed in its hard and dried state, and the said planographic printing surface of the said coating being further characterized by being readily wettable by but markedly less penetrable to greasy planographic image-forming materials and aqueous etching and dampening solutions as a result of the marked decrease in the porosity of the said initially porous coating due to its having been rubbed in its hard and dried state.

11. A planographic printing plate as defined in claim 10 in which the rubbed coating is a base coat on the base sheet.

12. A planographic printing plate as defined in claim 10 in which said coating includes a base coat containing the said hydrophilic adhesive and having the said finely divided mineral filler dispersed therethrough and a wash coat superimposed upon the said base coat and providing the said planographic image-receptive printing surface.

13. A planographic printing plate comprising a base whose printing surface includes at least one layer made up of a hard and dried coating including a hydrophilic adhesive having finely divided inert filler dispersed therethrough, said plate having decreased porosity and decreased penetrability to greasy planographic image-forming materials and aqueous etching and dampening solution resulting from rubbing a layer of the printing surface while it is in a hard dried state.

14. A planographic printing element comprising a base sheet having thereon a coating comprised of a finely divided filler dispersed in a hydrophilic colloid adhesive, the surface of said coating having planographic printing properties which have been improved by brushing in the hard and dry state and said brushed surface being less pentrable by ink than the unbrushed surface.

15. Process for the production of a planographic printing element which comprises providing a base sheet with a coating comprised of a finely divided filler dispersed in a hydrophilic colloid adhesive, drying said coating and brushing said coating in the hard and dry state whereby its penetrability by ink is reduced.

FREDERICK H. FROST.

REFERENCES CITED

The following references are of record in the file of this patent:

UNITED STATES PATENTS

| Number | Name | Date |
| --- | --- | --- |
| 1,651,011 | Adams | Nov. 29, 1927 |
| 1,863,976 | Fischer | June 21, 1932 |
| 2,104,126 | Hagelin | Jan. 4, 1938 |
| 2,115,471 | Rowell | Apr. 26, 1938 |
| 2,132,443 | Simons | Oct. 11, 1938 |
| 2,134,165 | Wescott | Oct. 25, 1938 |
| 2,154,219 | Shepherd | Apr. 11, 1939 |
| 2,156,100 | Simons | Apr. 25, 1939 |
| 2,230,981 | Toland | Feb. 4, 1941 |